United States Patent [19]

Torkelson

[11] Patent Number: 4,909,346
[45] Date of Patent: Mar. 20, 1990

[54] JET ENGINE NOISE SUPPRESSION SYSTEM

[75] Inventor: Delbert W. Torkelson, Claremore, Okla.

[73] Assignee: Nordam, Tulsa, Okla.

[21] Appl. No.: 372,051

[22] Filed: Jun. 27, 1989

[51] Int. Cl.[4] .............................. F02K 1/08; F02C 7/04
[52] U.S. Cl. .................................. 181/213; 181/214; 181/216; 181/220; 181/222; 60/262; 239/265.13; 239/265.17
[58] Field of Search ................................ 181/213–216, 181/219, 220, 222; 60/262, 264; 239/265.13, 265.17

[56] References Cited

U.S. PATENT DOCUMENTS

| | | | |
|---|---|---|---|
| 3,579,993 | 5/1971 | Tanner | 181/216 X |
| 3,710,890 | 1/1973 | True et al. | 181/215 |
| 3,829,020 | 8/1974 | Stearns | 181/216 X |
| 4,077,206 | 3/1978 | Ayyagari | 181/220 X |
| 4,117,671 | 10/1978 | Neal et al. | 60/262 |
| 4,215,536 | 8/1980 | Rudolph | 60/262 |
| 4,422,524 | 12/1983 | Osborn | 181/215 |
| 4,501,393 | 2/1985 | Klees et al. | 181/215 X |

Primary Examiner—B. R. Fuller
Attorney, Agent, or Firm—Head & Johnson

[57] ABSTRACT

A noise suppression system for use with a jet aircraft engine having a plug support cylinder affixed to the engine, a tubular ejector shroud affixed to the engine and encompassing the plug support, the shroud having a reduced internal diameter adjacent the aft end and a plurality of spaced apart blow-in openings formed circumferentially about the shroud forward end providing passageways for the entrance of ambient air from the exterior to the interior of the shroud. A blow-in door is secured to the shroud for opening and closing each of the blow-in openings. A translating plug is supported on the plug support cylinder and is positionable between a forward position and an aft position and forms an annular exhaust nozzle between the exterior of the plug and the interior of the aft end of the shroud. A daisy mixing nozzle is positioned within the shroud aft of the blow-in doors, the nozzle being configured of a plurality of lobes providing undulating interior and exterior surfaces. When the plug is in the forward position the blow-in doors are open permitting ambient air to mix with exhaust gas from the jet engine and the nozzle area is enlarged producing lower gas velocities and lower sound intensities. When the plug is in the aft position, the blow-in doors are closed and the nozzle area is reduced providing higher gas velocities for increased thrust with some increase in sound intensity.

6 Claims, 4 Drawing Sheets

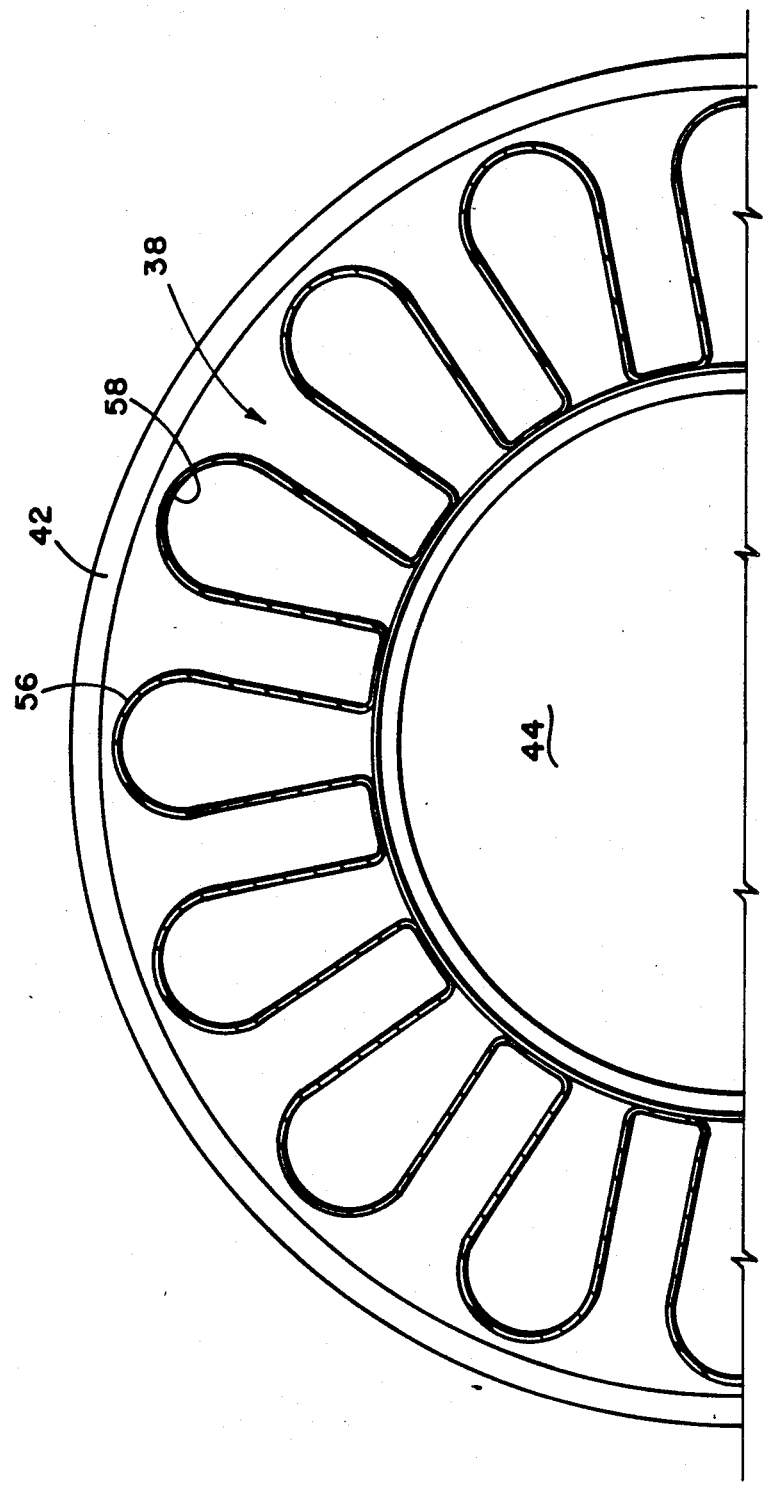

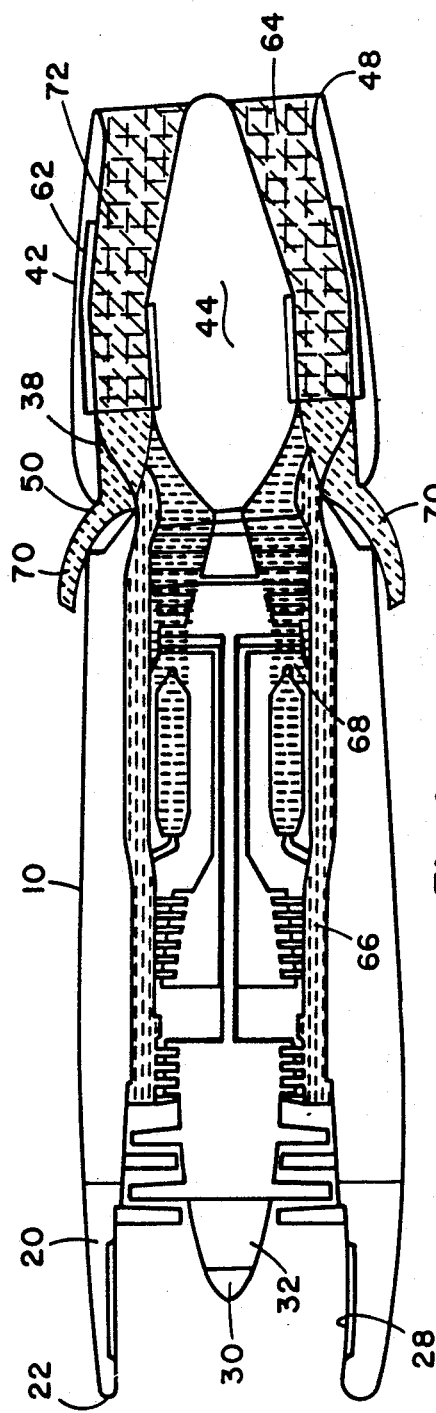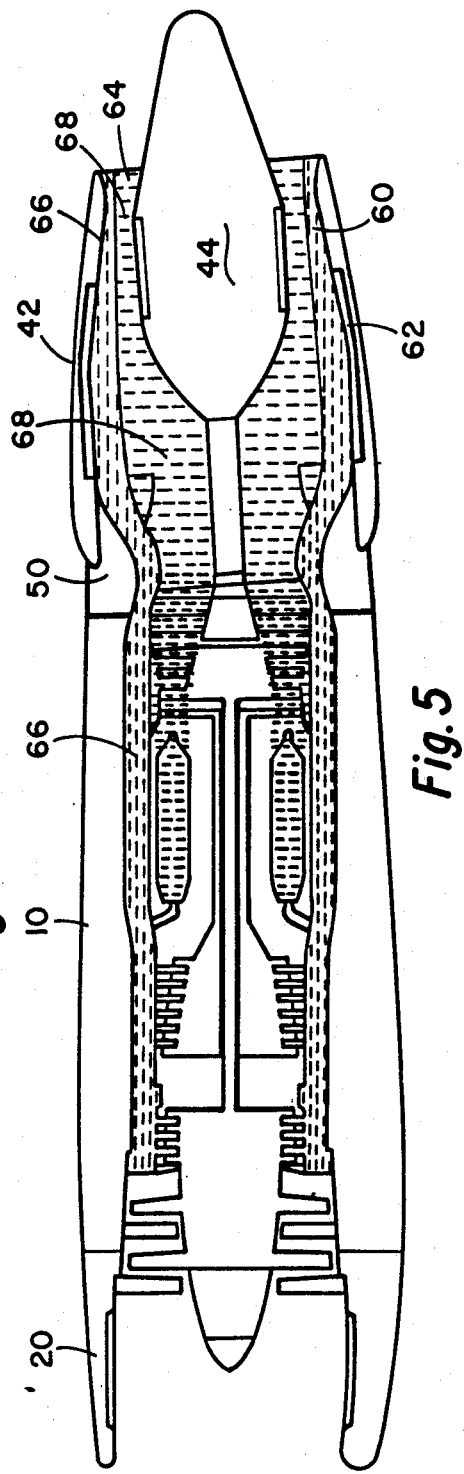

JET ENGINE NOISE SUPPRESSION SYSTEM

SUMMARY OF THE INVENTION

Aircraft noise is a matter of concern for airport operators in most metropolitan areas worldwide. In the United States along approximately 5 million people living or working adjacent United States airports are significantly affected by aircraft noise. These people reside within areas exposed to an average day-night sound level of 65 decibels or greater, the maximum level identified by the FAA as being compatible with residential development.

Municipalities throughout the United States have taken action to reduce airport noise. Similar actions have been taken or are under study in most other industrialized nations of the world.

Others have suggested concepts for reducing the noise produced by jet engines and for background information relating to noise reduction systems for jet engines reference may be had to U.S. Pat. Nos.: 3,710,890; 4,077,206; 4,117,671 and 4,501,393. These four previously issued U.S. patents are exemplary of the prior art relating to the general concept of the modification of aircraft jet engines to reduce the noise intensities thereof. These four previously issued U.S. patents are incorporated herein by reference.

The present disclosure provides an improved and more effective system for use in conjunction with a jet aircraft engine to reduce the noise level of the engine during takeoff and landings of the aircraft while at the same time preserving economy of operation of the engines. The noise suppression system of this disclosure, for use in combination with a jet aircraft engine, includes a plug support cylinder which has a forward end affixed coaxially to the jet engine aft end. A tubular ejector shroud is affixed to the egine aft end. The shroud is coaxially of the engine and has a reduced internal diameter area adjacent the aft end.

formed in the shroud in a plane perpendicular to the tubular axis thereof and adjacent the forward end are a plurality of circumferentially spaced blow-in openings. Each blow-in opening provides a passageway for the entrance of ambient air from the exterior to the interior of the shroud. A blow-in door is secured to the shroud for each of the blow-in openings. Each door has a closed and an opened position.

A translating plug of generally tear drop external configuration is received on and supported by the plug support cyclinder. The translating plug is symmetrical about the plug support cylinder axis and is of external diameter less than the internal diameter of the shroud. The translating plug is selectively positionable on the plug support cylinder between a forward and an aft position.

An annular exhaust nozzle is formed between the exterior of the plug and the interior of the shroud. When the plug is in the forward position, a relatively larger cross-sectional area of the annular nozzle is provided. When the plug is in the aft position, a relatively smaller cross-sectional area of the annular nozzle is formed.

A daisy mixing nozzle is received within the shroud and adjacent the forward end thereof, but aft of the blow-in openings. The mixing nozzle is, in cross-sectional configuration, taken perpendicular the tubular axis thereof in the form of a plurality of lobes providing undulating interior and exterior surfaces.

When the translating plug is in the forward position, as used during take-off and landing, the blow-in doors are open and the annular nozzle is of substantially increased cross-sectional area. This allows ambient air to pass inwardly into the interior of the shroud and to be mixed with exhaust gases from the jet engine, the mixture being augmented by the daisy mixing nozzle. With the plug in the forward or "suppressed" mode, the mixing of outside air with the jet engine fan and primary air flow is obtained. The multi-lobe nozzle shortens the mixing region and reduces the mean velocity gradients which result in reduced jet noise. The cooler outside air provides additional mass for thrust augmentation to offset the thrust loss associated with the lower velocity of the jet stream passing out the aft end of the ejector shroud.

The plug is moved or translated aft in the cruise mode, that is, after takeoff and before landing, to provide optimum nozzle efficiency. When the system is in the cruise mode, the annular nozzle formed between the plug and the trailing edge of the interior portion of the shroud is reduced in cross-sectional area. The blow-in doors are closed, converting the shroud into a pressure vessel which directs the engine exhaust to the annular nozzle.

In the preferred arrangement, the ejector shroud is accoustically lined such as with a perforated, braised Inconel honeycomb panel to provide attenuation of higher frequency noises created by the lobe nozzle and higher level turbine tones.

In a further preferred embodiment, the jet engine is provided with a nose cone fitted coaxially on the engine forward end in which is positioned accoustic lining. In addition, a nose bullet is preferably secured to the engine forward end within the nose cowling, the nose bullet being at least substantially covered with an acoustic liner.

The combination of the ejector suppressor at the rearward end of the jet engine with the acoustically lined nose cowl and nose bullet at the forward end, results in a jet engine which produces a substantially reduced level of noise during takeoff and landing while maintaining high efficiency levels at cruise altitudes.

A better understanding of the invention will be had by reference to the following description of the preferred embodiment and the claims, taken in conjunction with the attached drawings.

DESCRIPTION OF THE DRAWINGS

FIG. 3 is an enlarged cross-sectional view taken along the line 3—3 of FIG. 2 and showing the cross-sectional configuration of the daisy mixing nozzle.

FIG. 4 is an elevational diagrammatic cross-sectional view of a jet engine having a noise suppression system of this disclosure and showing the relationship of components and the flow of gases and air when the system is in the suppression mode as used during takeoffs and landings to reduce noise levels.

FIG. 5 is an elevational diagrammatic cross-sectional view as in FIG. 4 showing the relationship of components and the flow of gases with the system in the cruise mode at which maximum thrust efficiency is attained.

DESCRIPTION OF THE PREFERRED EMBODIMENT

Figure 1:
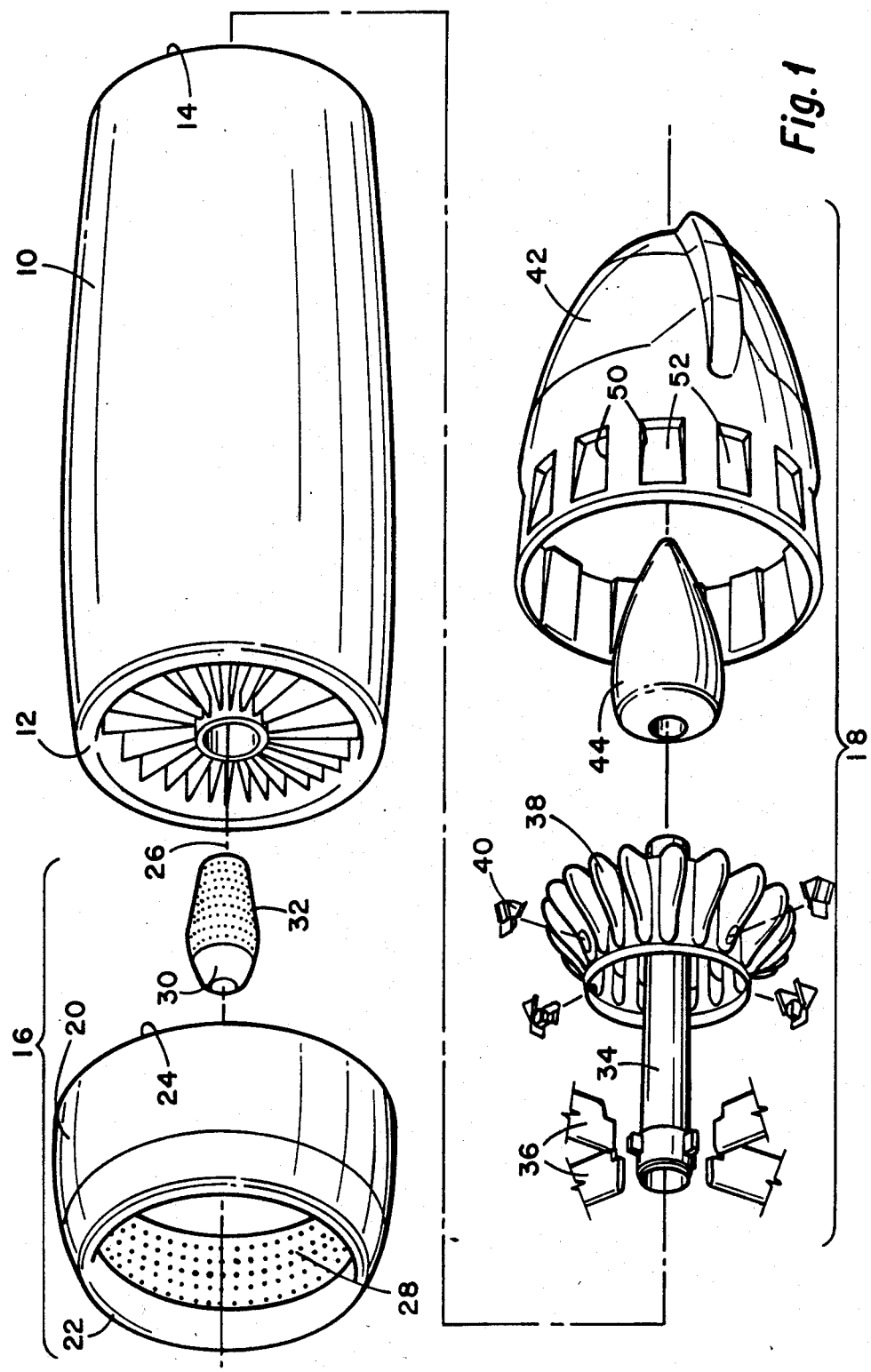
FIG. 1 is an isometric exploded view of a jet engine with the basic components making up the noise suppressor system of this disclosure.

Referring first to FIG. 1, the essential elements of the noise suppression system of this disclosure are shown. A jet aircraft engine is generally illustrated and identified by the numeral 10. The jet engine has a forward end 12 and an aft end 14. The engine 10 is of the type in present common commercial use and includes rotary turbine components (not shown) by which air drawn into the engine through the forward end is compressed, mixed with fuel, and expanded through other turbine components to produce, at the aft end 14 thereof, expelled combustion gases by which thrust is produced. The engine 10 produces substantial noise, particularly during high thrust requirements, and such noise is of greatest concern when the aircraft, with which the engine 10 is used, is closest to the ground, that is, during take-offs and landings. This disclosure is concerned with reducing the noise generated by the typical jet aircraft engine 10 during takeoffs and landings.

The system of this disclosure consists basically of two portions, that is, a forward portion indicated by bracket 16 and an aft or exhaust system indicated by bracket 18.

The forward system includes a nose cowl 20 having a forward end 22 and an aft end 24. The aft end is secured to the engine forward end 10, and the cowl is supported coaxially about the longitudinal axis of engine 10. It is about this longitudinal axis, indicated by the numeral 26, that the engine rotary turbine components (not shown) rotate.

The nose cowl 20 is provided with a noise suppressor lining 28. The lining and configuration of the nose cowl are selected and tuned to absorb turbine-machinery or siren-type noise of the engine which is particularly prevalent during aircraft landing approach.

The noise suppressor lining 28 may be of honeycomb material having sound absorbtive characteristics and with the physical requirements to withstand the environment to which it is subjected.

Another element of the forward portion 16 of the noise suppression system includes a nose bullet 30 affixed coaxially to the forward end of jet engine 10. The noise bullet is at least substantially covered on the exterior surface thereof with a noise suppressor lining 32. The combination of the noise suppressor lining 28 on the interior of nose cowl 20 and on the exterior of the nose bullet 30 combines to reduce the turbine-machinery or siren-type noise generated by the engine 10.

The components making up the exhaust noise suppression system 18 include a plug support cyclinder 34; cruciform plugs support elements 36; a multi-lobe daisy mixing nozzle 38, cruciform nozzle attachment brackets 40; an ejector shroud 42; and a translating plug 44.

Figure 2:
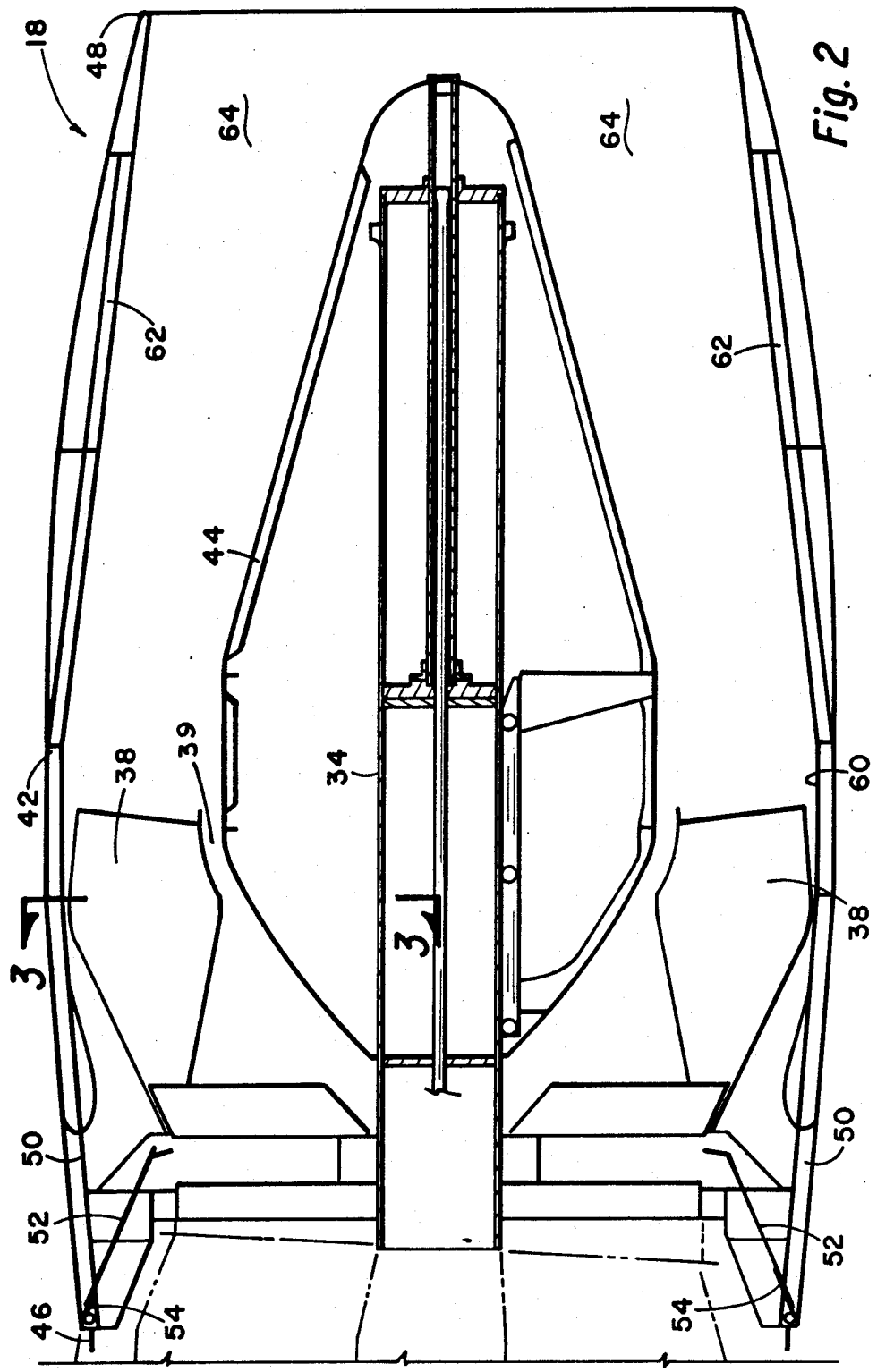
FIG. 2 is an enlarged cross-sectional view of the ejector suppressor with the translating plug in the forward or suppressed mode.

Referring to FIG. 2, a cross-sectional view of the exhaust system 18 is shown. The translating plug 44 is slideably mounted on the plug support cylinder 34 and is positionable between a forward position as illustrated in FIG. 2 and aft position which will be illustrated and described subsequently. Positioning the translating plug 44 on the plug support cylinder 34 can be accomplished either hydraulically or electromechanically, such translating mechanisms are well within the skill of the aircraft engineer, and, therefore, are not illustrated herein in detail.

The ejector shroud is tubular and has a forward end 46 which is affixed to the engine aft end 14. The shroud 42 has an aft end 48 which is open and through which the exhaust gas from the engine escapes to produce engine thrust.

Formed circumferentially about the ejector shroud 42 and adjacent the forward end thereof are a plurality of blow-in openings 50. Each of the openings is provided with a door 52 so that each opening may be opened or closed, depending upon the position of the door 52. In the illustrated and preferred arrangement, the doors are biased by a spring so that the doors are biased to the closed position.

Received within the ejector shroud 42 is the daisy mixing nozzle 38. The mixing nozzle 38 is tubular with relatively thin walls formed in the shape of a plurality of lobes. Referring to FIG. 3, the daisy mixing nozzle is shown in cross-section with undulating exterior surface 56 and interior surface 58. The function of the daisy mixig nozzle is to augment the mixing of exhaust gas from jet engine 10 with air drawn through the blow-in openings 50.

Accoustic lining 62 is formed on the interior 60 of ejector shroud 40 adjacent the rearward end 48. This accoustic lining is preferably formed of honeycomb material capable of withstanding the high temperatures to which it is subjected and may be such as of honeycomb Inconel or other high temperature resisting metal alloys.

An annular nozzle area 64 is formed between the exterior of plug 44 and the interior of ejector shroud 42 adjacet the shroud rearward end 48. The cross-sectional area of this annular nozzle 64 controls the velocity of turbine produced gases passing out the rearward end of the ejector shroud which expels gas which produces the engine thrust.

Referring to FIGS. 4 and 5, the principle of operation of the system is diagrammatically illustrated. In FIG. 4 the engine is shown in the suppressed or take-off and landing mode, that is, the mode in which the engine produces minimum noise. Air is drawn into the open forward end 22 of nose cowl 20, is compressed, and is mixed with fuel in the engine. The expanded gas from the fuel passes through the engine turbine portion and out through the rearward end of the engine. Compressed engine fan air flows around exterior portions of the engine. The compressed engine fan air is indicated by numeral 66 and the engine primary air is indicated by numeral 68. The combination of the engine fan air 66 and engine primary air 68 passing rearwardly from the engine 10, and produces the thrust attained by the engine. In the suppression mode of FIG. 4, plug 44 is in the forward or suppressed position. The blow-in openings 50 are open permitting ambient air 70 to pass through the openings and into the interior of the ejector shroud 42. Thus, there are three sources of air into the ejector shroud, that is, the fan engine air 66, the primary engine air 68, and ambient air drawn in through the blow-in openings indicated by numeral 70. These gases are mixed and the mixture is augmented by daisy mixing nozzle 38. The mixed gas is indicated by numeral 72. The mixed gas exits the aft end 48 of the ejector shroud 42 producing engine thrust. It is noted that in FIG. 4 the annular nozzle area 44 is relatively large which means that the gas velocity at the shroud exit end 48 is reduced, thereby substantially reducing engine noise.

FIG. 5 shows the engine in the cruise mode. In this mode, the plug 44 is in the aft or cruise position. The blow-in openings 50 are closed so that no ambient air is introduced into the ejector shroud 42. The annular nozzle 64 between the exterior of plug 44 and the interior 60 of the ejector shroud is substantially reduced in area, thereby increasing the velocity of gas passing out of the engine for maximum thrust per units of gas volume.

An important aspect of this invention provides means for aircraft jet engine noise suppression during the peak noise suppression mode, i.e., take-off and landing based upon the size and shape of annular slot 39 formed between plug 44 and the multi-lobe daisy mixing nozzle 38. The shape of and changes in annular space 39 have been found to cause significant shifts in peak frequency of the jet noise and accompanying sound pressure levels, which also reduces the required thickness of accoustical surface lining within the ejector shroud. Changes in the space 39 can occur by the design of the plug 44 and its movement relative to nozzle 38, and/or the dimensional design of nozzle 38.

Low frequency noise suppression continues even in the cruise mode (FIG. 5), based upon the size of the annular slot 39, thereby reducing cabin interior noise, speech interference levels, and reducing general passenger discomfort.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. In combination with a jet aircraft engine in which the engine has a forward air intake end, and an aft exhaust gas discharge end, the engine having a longitudinal axis about which turbine components rotate, a noise suppression system, comprising:

a plug support cylinder having a forward end affixed coaxially to said jet engine aft end and the cylinder having a rearward end;

a tubular ejector shroud having a forward end affixed to said engine aft end and the shroud having an open aft end, the shroud being coaxial of said engine and having a reduced internal diameter adjacent the aft end, the shroud having in a plane perpendicular the tubular axis and adjacent the forward end thereof, a plurality of circumferentially spaced blow-in openings providing passageways for entrance of ambient air from an exterior to an interior of the shroud, a blow-in door secured to said shroud for each of said blow-in openings, each door having a closed and an open position;

a translating plus of generally tear drop external configuration received on and supported by said plug support cylinder, the translating plug being symmetrical about said plug support cylinder and external diameter less than the internal diameter of said shroud, the translating plug being selectably positionable on said plug support cylinder between a forward position and an aft position, an annular exhaust nozzle being formed between an exterior of the plug and the interior of the shroud, and providing a relatively larger cross-sectional area of the annular nozzle when said plug is in the forward position and a relatively smaller cross-sectional area of the annular nozzle when said plug is in the aft position; and a daisy mixing nozzle received within said shroud and adjacent the forward end thereof, the nozzle being in a form of a tubular member configured of a plurality of lobes providing undulating interior and exterior surfaces, the mixing nozzle being aft of said blow-in openings, whereby when said plug is in the forward position said blow-in doors are open permitting ambient air to mix with exhaust gas from said jet engine and said nozzle area is enlarged producing lower gas velocities and lower sound intensities at the shroud aft end and when said plug is in the aft position said blow-in doors are closed and said nozzle area is reduced producing higher gas velocities for increased thrust.

2. A noise suppression system for a jet engine according to claim 1 wherein each said blow-in door is spring loaded and biased towards the closed position.

3. A noise suppression system for a jet engine according to claim 1 including:

accoustical lining affixed to the interior of said ejector shroud in at least a portion thereof adjacent said aft end.

4. A noise suppression system for a jet engine according to claim 1 including:

a tubular nose cowl having an open forward end and a rearward end, the rearward end being affixed coaxially with said jet engine forward air intake end; and accoustical lining affixed to an interior of said nose cowl.

5. A noise suppression system for a jet engine according to claim 4 including:

a nose bullet affixed coaxially to said jet engine at the forward end and coaxially within said nose cowl; and accoustic lining affixed to at least a substantial portion of an exterior surface of said nose bullet.

6. A noise suppression system according to claim 1 including means to provide a selected annular space between said translating plug and said daisy mixing nozzle to thereby increase peak frequencies of said gas passing therethrough resulting in lower sound pressure levels.

* * * * *